United States Patent [19]

Johnson

[11] Patent Number: 5,115,948

[45] Date of Patent: May 26, 1992

[54] TOOTHPASTE DISPENSER WITH A FLEXIBLE AIR COMPRESSING BAG USED TO BRING ABOUT DISPENSING

[76] Inventor: Robin L. Johnson, 1271 Redbush Rd., Akron, Ohio 44320

[21] Appl. No.: 538,530

[22] Filed: Jun. 15, 1990

[51] Int. Cl.⁵ .............................................. G01F 13/00
[52] U.S. Cl. .................................. 222/209; 222/386.5; 222/389
[58] Field of Search ................ 222/209, 389, 401, 94, 222/386.5

[56] References Cited

U.S. PATENT DOCUMENTS

| | | | |
|---|---|---|---|
| 3,184,120 | 5/1965 | Undi | 222/209 |
| 3,494,513 | 2/1970 | Bauer | 222/386.5 |
| 4,386,717 | 6/1983 | Koob | 222/94 |
| 4,640,442 | 2/1987 | Drobish | 222/386.5 |
| 4,877,156 | 10/1989 | Clanet et al. | 222/386.5 |

FOREIGN PATENT DOCUMENTS

| | | | |
|---|---|---|---|
| 3515101 | 10/1986 | Fed. Rep. of Germany | 222/389 |
| 3530212 | 10/1986 | Fed. Rep. of Germany | 222/389 |
| 3708396 | 10/1987 | Fed. Rep. of Germany | 222/389 |

*Primary Examiner*—Michael S. Huppert
*Assistant Examiner*—Anthoula Pomrening
*Attorney, Agent, or Firm*—William J. Ruano

[57] ABSTRACT

A toothpaste dispenser having a chamber which is operated by a flexible bag extending longitudinally alongside the chamber. A one way valve is provided at the bottom of the chamber through which air, under pressure, is introduced when the bag is compressed manually. A toothpaste pusher inside the chamber is moved vertically upwardly by the air under pressure introduced through the one-way valve. The toothpaste pusher takes the form of a bellows.

9 Claims, 5 Drawing Sheets

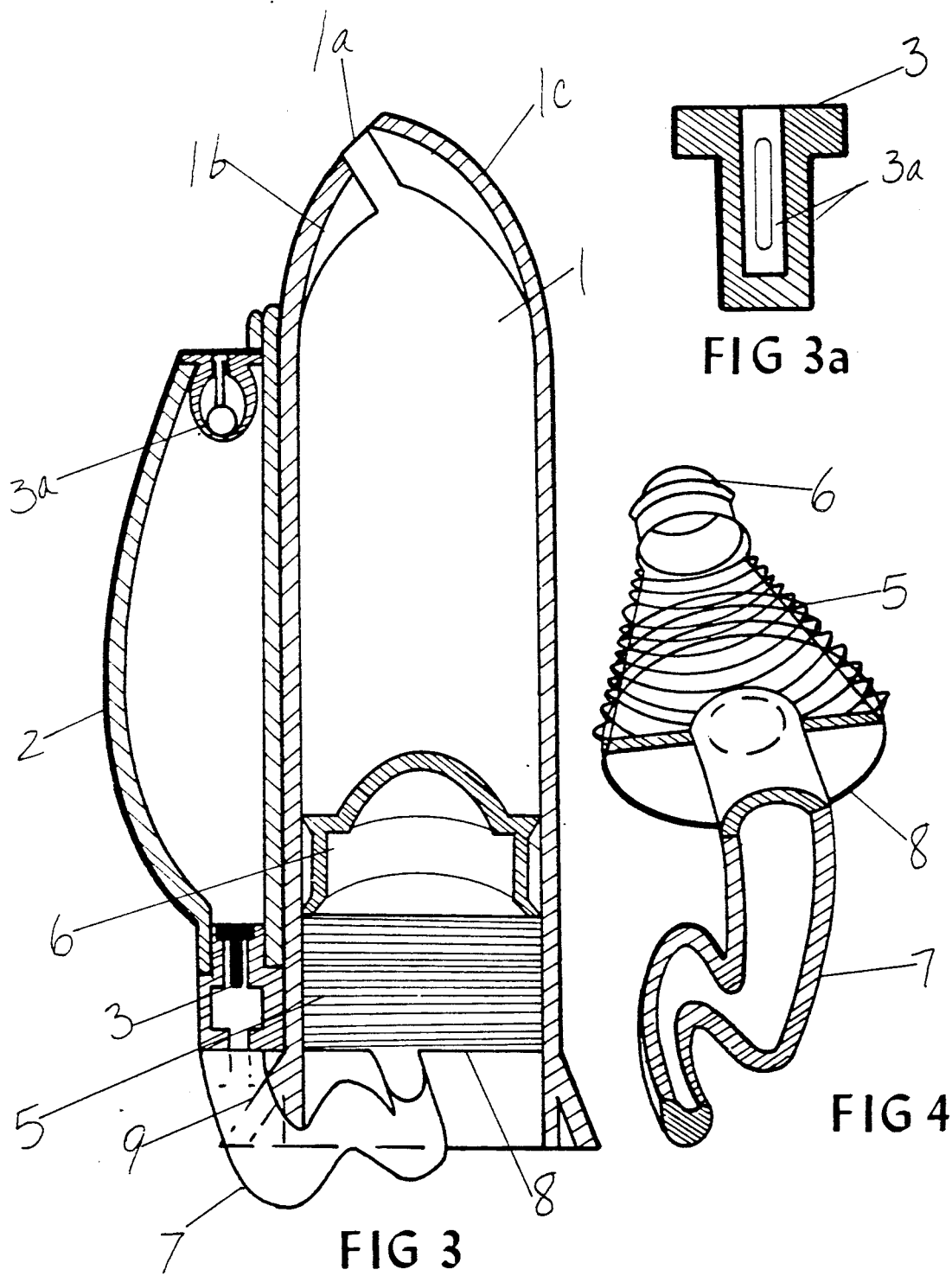

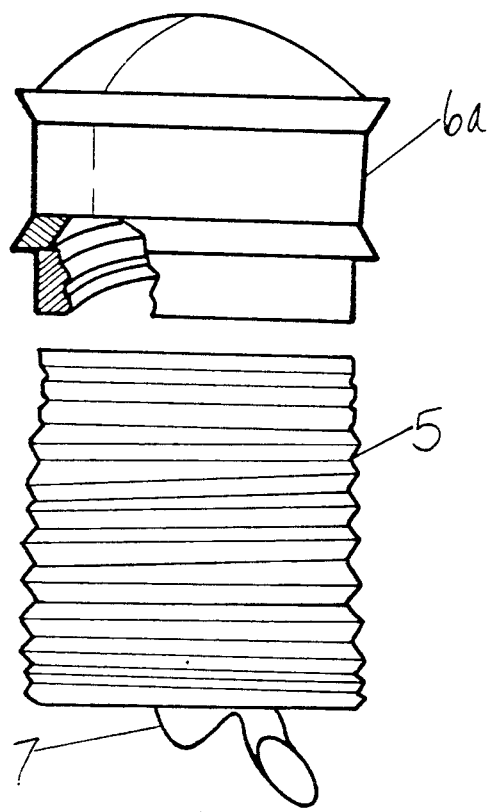
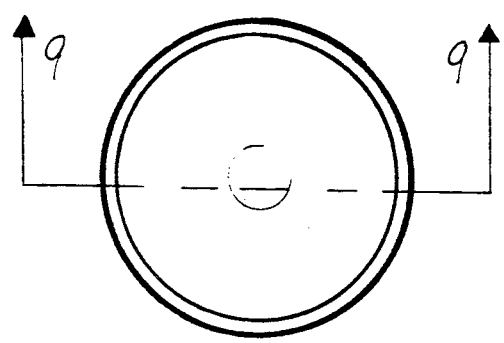
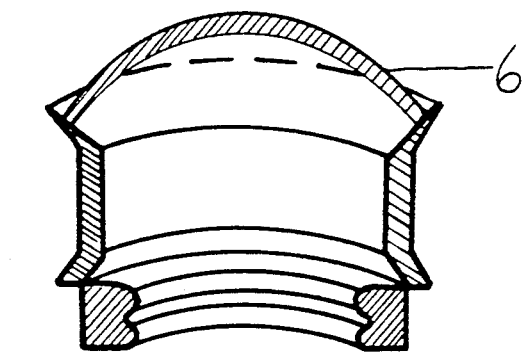
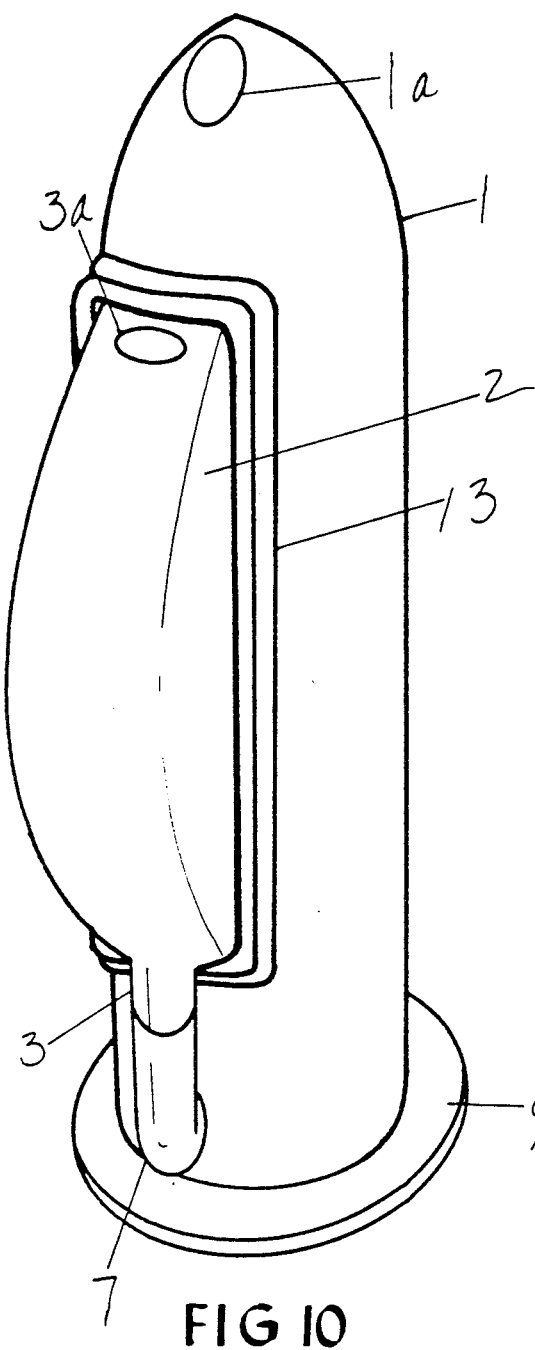

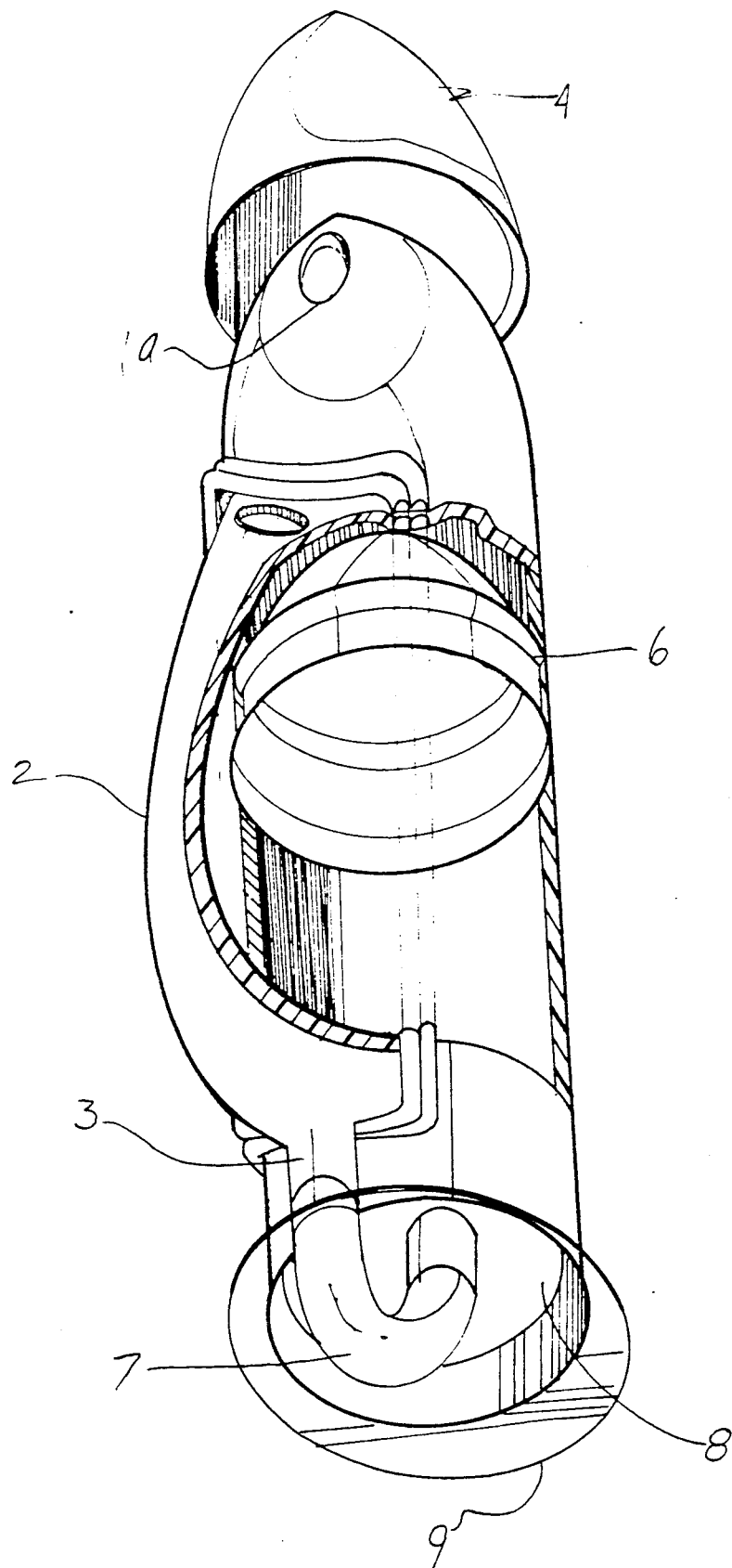
FIG II

TOOTHPASTE DISPENSER WITH A FLEXIBLE AIR COMPRESSING BAG USED TO BRING ABOUT DISPENSING

This invention relates to improvements in a toothpaste dispenser.

BACKGROUND OF THE INVENTION

Toothpaste dispensers as presently used have the disadvantage of difficulty to operate, particularly by older persons, especially those having arthritis, in that spring valves are used requiring considerable finger pressure. Also, the mechanism for applying pressure to the dispenser is complicated, adding considerable expense to the dispenser.

SUMMARY OF THE INVENTION

An object of the present invention is to provide a novel toothpaste dispenser which overcomes the above-named disadvantages. More specifically, a toothpaste dispenser of the present invention is operated by an air bag of flexible material, such as rubber, extending alongside the dispenser, which bag has one-way valve means for creating air pressure in a toothpaste container for acuating a toothpaste pushing means therein which may be either in the form of a piston or flexible bellows simulating that of a concertina.

BRIEF DESCRIPTION OF THE DRAWINGS

FIG. 3 is a vertical, cross-sectional view taken along line 3—3 of FIG. 2; and FIG. 3a is an enlarged section of valve 3;

FIG. 4 is a vertical cross-sectional view of the bellows in perspective shown in FIG. 3;

FIG. 7 is an elevational view of a modified bellows with the top portion or piston shown partly in cross-section;

FIG. 8 is a top view of piston-bellows of FIG. 7;

FIG. 9 is a vertical sectional view taken along line 9—9 of FIG. 8;

FIG. 10 is a top perspective view of a modified assembly; and

FIG. 11 is a bottom perspective view of FIG. 10 with cut-out portions shown in section together with an additional cover 4 shown removed.

DETAILED DESCRIPTION OF THE PREFERRED

Figures 1, 2:
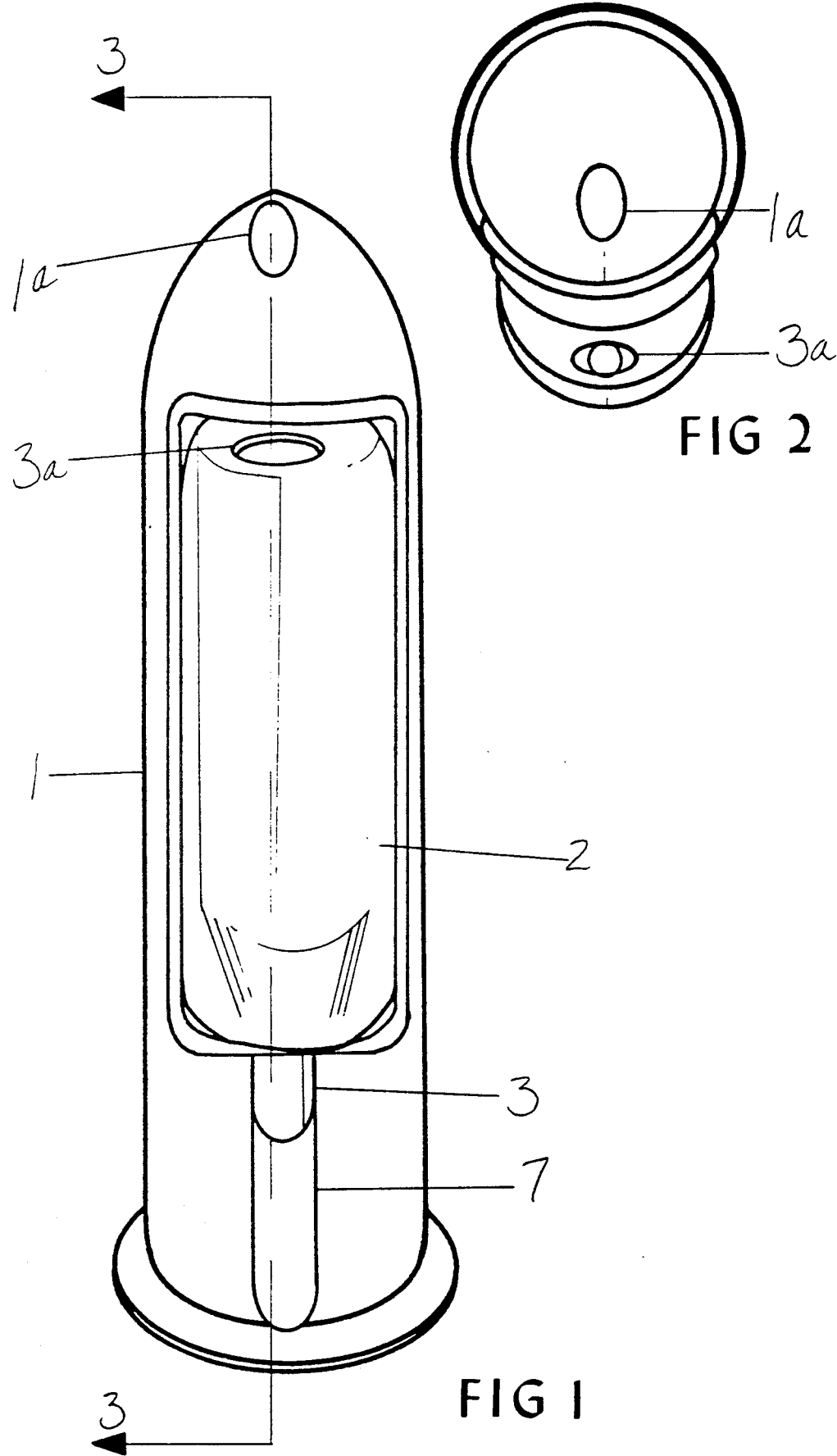
FIG. 1 is a front view.
FIG. 2 is a top view of the toothpaste dispenser embodying the present invention.

Referring to FIGS. 1, 2, 3, 3a and 4, numeral 1 denotes a main cylindrical chamber which contains toothpaste (not shown). The toothpaste is dispensed through a curved outlet 1a defined by top portion 1b and 1c of the chamber 1. A base 9 is provided which supports a hose 7 connecting bag 2 to chamber 1.

Within the chamber 1 there is mounted a bellows 5 of cylindrical shape, much like that of a concertina. The bellows is covered by a piston 6 having a shape similar to that of the base of portions 1b and 1c. Therefore, when sufficient compressed air is introduced by pressing on a flexible bag 2, piston 6 will be raised in increments until it seats to the base of portions 1b and 1c.

Figure 5:
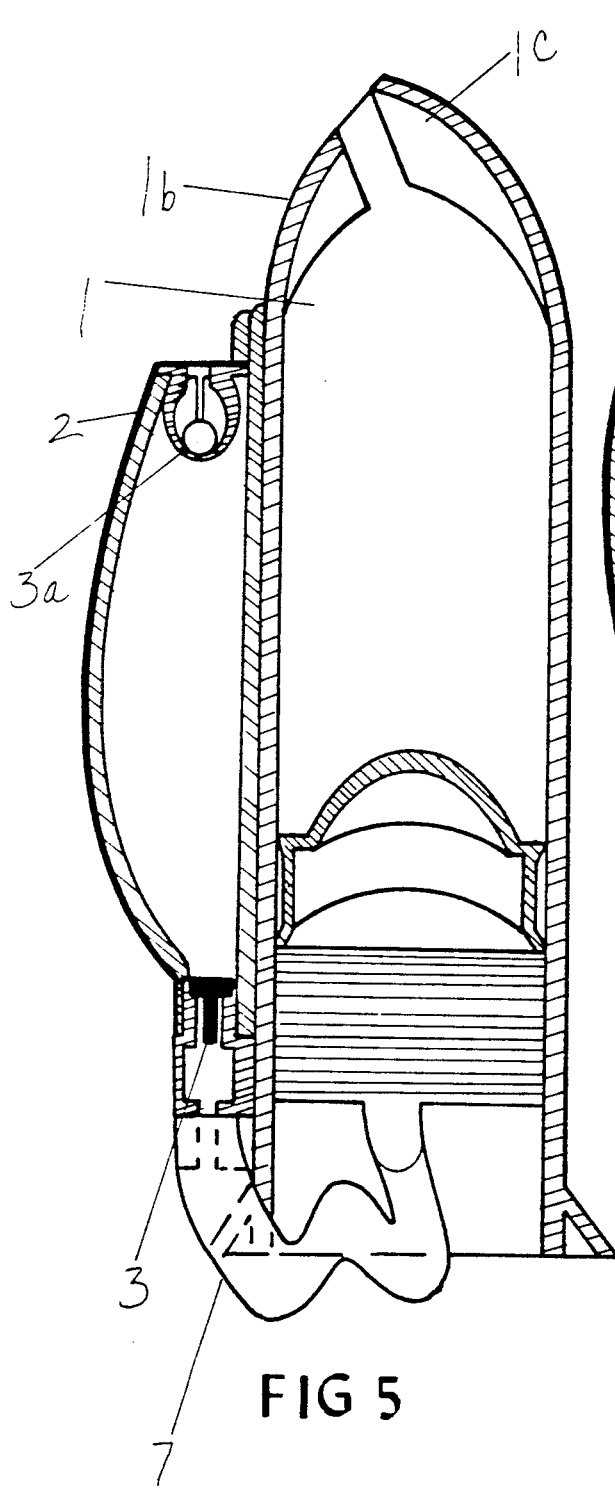
FIG. 5 is a vertical cross sectional similar to FIG. 3 showing the position of the one-way valves before compressing the bag and FIG. 6 is the same cross-sectional view showing the portions of the one way valves after compressing.
Figure 6:
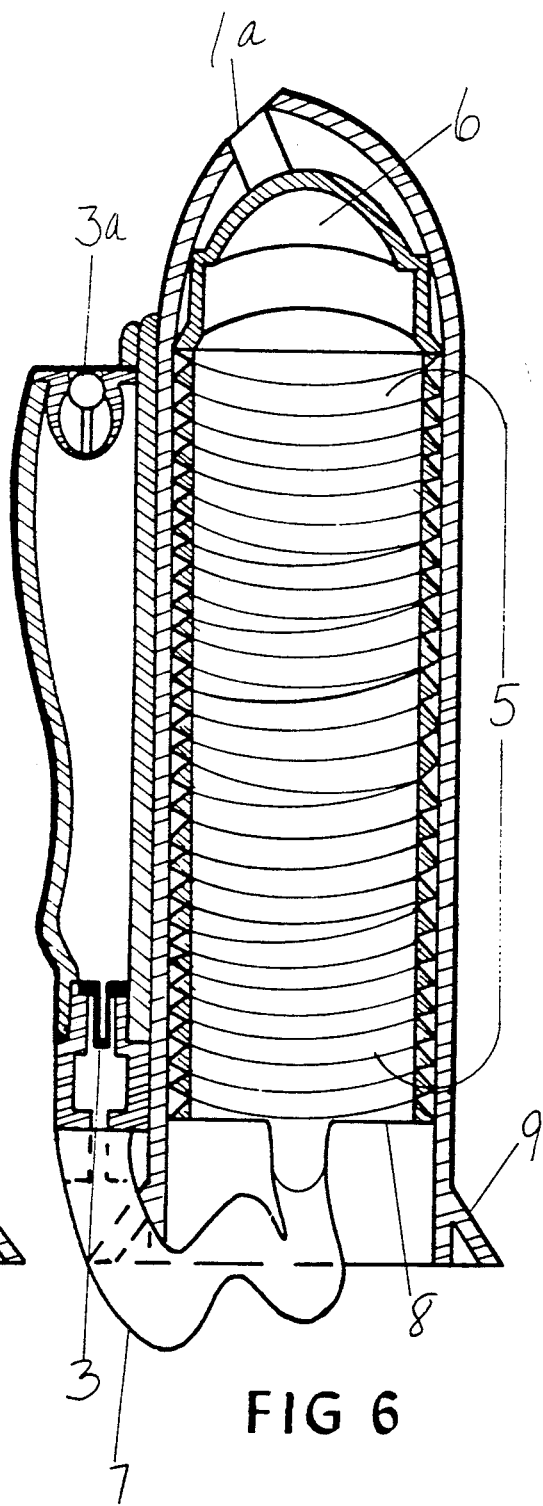

In operation, when the bag 2 is compressed from the position shown in FIG. 3 or FIG. 5 to that shown in FIG. 6, the one way ball valve 3a will be lifted so as to close and at the same time, the one way valve 3 will allow compressed air to flow into hose 7 which leads into bellows 5. Upon release of pressure from bag 2, air will be drawn in through one way valve 3a, as shown in FIGS. 3 and 5. Thus compressed air is introduced in increments until piston 6 moves from the position of FIGS. 3 and 5 to that shown in FIG. 6 which indicates that all the toothpaste has been dispensed.

FIG. 3a more clearly illustrates the construction of the one-way valve 3, preferably of rubber of somewhat cup shape with four or more razor thin slits 3a in the sides thereof which will open when sufficient pressure is introduced therein and automatically close when the pressure decreases to a predetermined valve.

FIGS. 7, 8 and 9 show a modified bellows having a cap-like piston 6a having internal threads in its base which screw onto the top of bellows 5.

FIGS. 10 and 11 show a further modification wherein bag 2a has a flat base mounted on a base 13 having a flat outer surface and which is integrally formed on the chamber. As shown in FIG. 11, a detachable cap 4 is provided which closely fits the top of the chamber.

A further modification of the bellows (not shown) is a rubber balloon having outer, spaced circular beads which slide on the inner surface of the chamber.

While a toothpaste dispenser has been described, the same dispenser is useful for dispensing other pasty material, as well.

While I have illustrated and described several embodiments of my invention, it will be understood that these are by way of illustration only and that various changes and modifications are comtemplated in my invention within the scope of the following claims.

I claim:

1. A toothpaste dispenser comprising a cylindrical tube having a toothpaste dispensing nozzle at the top end thereof, a pneumatic toothpaste pushing tube positioned at the bottom thereof, a flexible air compressing bag disposed alongside said cylindrical tube having a hose connected to the bottom of said toothpaste pushing tube, including one-way valve means enabling introduction of compressed air at the bottom of said cylindrical tube into said toothpaste pushing tube by squeezing said bag, toothpaste pneumatic pushing means positioned directly above said toothpaste pushing tube actuated by said compressed air introduced at the bottom of said cylindrical tube into said toothpaste pushing tube for forcing toothpaste to exit through said nozzle.

2. A toothpaste dispenser as recited in claim 1 wherein said toothpaste dispensing nozzle is curved towards the side of said cylindrical tube so as to dispense toothpaste substantially horizontally of said cylindrical tube.

3. A toothpaste dispenser as recited in claim 2 wherein said toothpaste pushing means is in the form of a piston closely fitting the inner wall of said cylindrical tube.

4. A toothpaste dispenser as recited in claim 3 wherein the upper side of said piston is convexly curved.

5. A toothpaste dispenser as recited in claim 2 wherein said toothpaste pushing tube is in the form of a flexible bellows simulating that of a concertina.

6. A toothpaste dispenser as recited in claim 5 wherein said toothpaste pushing means is in the form of a cap screwed to the top of said bellows.

7. A toothpaste dispenser as recited in claim 2 together with a slip-fitted detachable cap on said toothpaste dispensing nozzle.

8. A toothpaste dispenser as recited in claim 1 together with a flat base alongside said cylindrical tube on which said air compressing bag is mounted.

9. A paste dispenser comprising a cylindrical tube having a paste dispensing nozzle of at the top end thereof, which nozzle is curved toward the side thereof, a pneumatic paste pushing tube positioned at the bottom thereof, a flexible air compressing ban dispensed alongside said cylindrical tube having a hose connected to the bottom of said paste pushing tube, including one-way valve means enabling introduction of compressed air at the bottom of said cylindrical tube into said paste pushing tube by squeezing said bag, paste pneumatic pushing means positioned directly above said paste pushing tube actuated by said compressed air introduced at the bottom of said cylindrical tube into said paste pushing tube for forcing compressed-paste to exit through said nozzle, and a detachable cap slip-fitted to the top of said cylindrical tube.

* * * * *